Jan. 10, 1928.
C. H. SHEASLEY
1,655,775
STUFFING BOX FOR INTERNAL COMBUSTION ENGINES
Filed Feb. 20, 1926
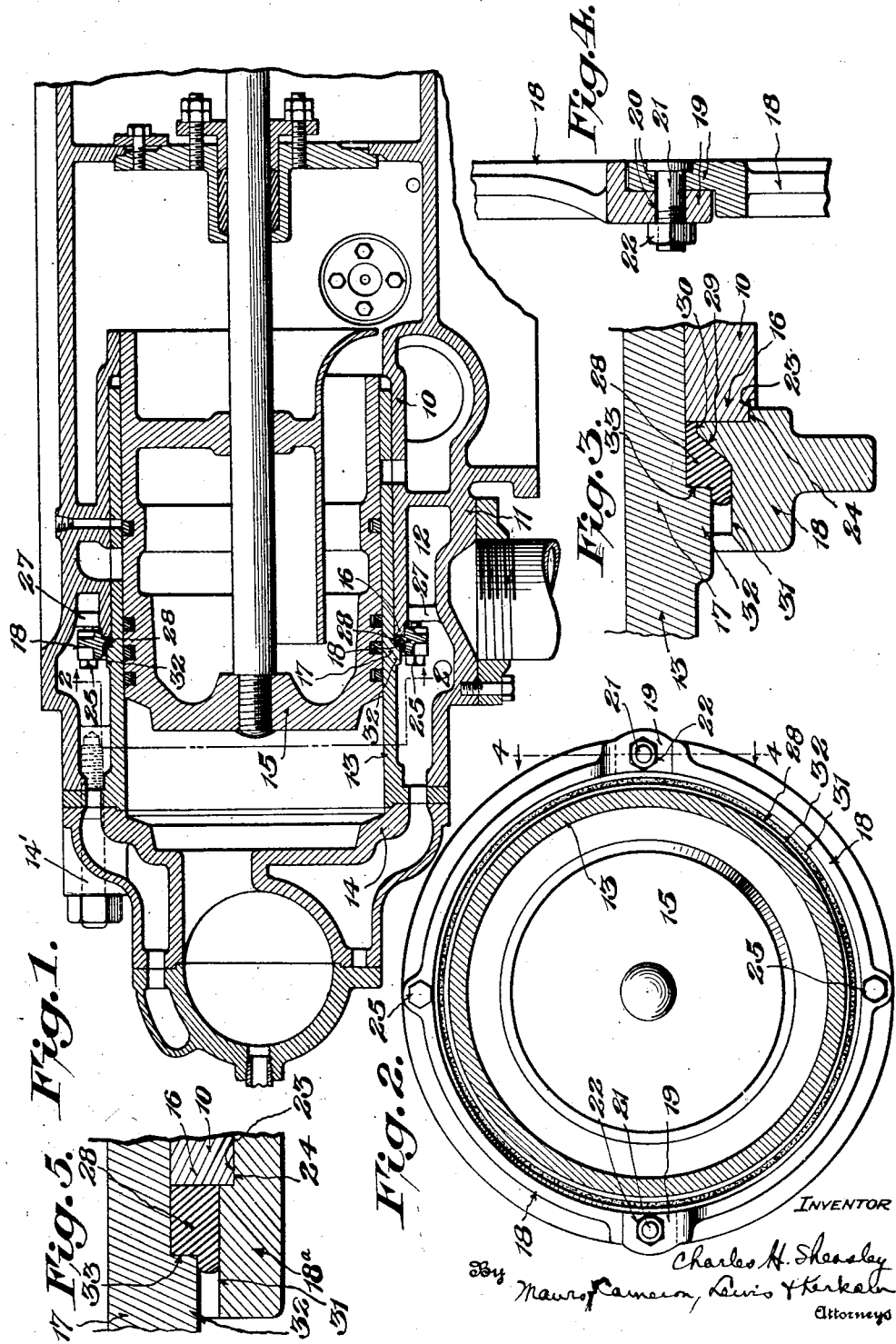
INVENTOR
Charles H. Sheasley
By Mauro, Cameron, Lewis & Kerkam
Attorneys Patented Jan. 10, 1928.

1,655,775

UNITED STATES PATENT OFFICE.

CHARLES H. SHEASLEY, OF FRANKLIN, PENNSYLVANIA.

STUFFING BOX FOR INTERNAL-COMBUSTION ENGINES.

Application filed February 20, 1926. Serial No. 89,820.

This invention relates to stuffing boxes for internal combustion engine cylinders, and while capable of use in a wide variety of cylinder constructions, it is of particular utility for sealing the joint between a cylinder wall and a liner which projects exteriorly of the cylinder wall.

A wide variety of constructions have heretofore been proposed for sealing the joint between a cylinder wall and its liner. Where this joint comes within the water jacket of the engine, it is necessary that the joint be sealed both to prevent the escape of gases from the cylinder into the water jacket, with the consequent formation of gas pockets in the water jacket which interfere with and may prevent the proper cooling of the engine, and also to prevent the leakage of water into the cylinder with the consequent difficulties attendant upon the presence of water in the lubricating oil, etc. The provision of a fluid-tight joint at this point between the cylinder wall and its liner has presented many serious difficulties because this joint, being within the water jacket, can not be reached after the engine is assembled and accordingly the stuffing box provided therefor must, after assembly of the engine, be completely effective without further adjustment under all of the changes in engine temperature, with the attendant expansion and contraction of the parts in both radial and axial directions. Various forms of stuffing boxes have been suggested wherein packing material is confined and forced into sealing contact with the elements of the joint when the bolts are set up to force home the liner, or the cylinder head, etc. But while packing material is readily deformable, it is substantially incompressible, and the many forms of stuffing boxes heretofore suggested, wherein the packing material has been so confined that reliance has been placed on compression of the packing material to seal the joint, have given much trouble because of unavoidable variations, incident to manufacturing processes, in the sizes or relative locations of the elements of the joint and the stuffing box. Hence it is frequently very difficult, and sometimes impossible, to force the parts home to proper position in assembling the engine because of the resistance of the packing material, while at other times proper sealing contact with the elements of the joint is not obtained because of insufficient pressure on the packing material when the liner and cylinder wall are assembled. Experience has demonstrated that where the packing material is so confined that the parts cannot be forced home without a substantial compression of the packing material, it is practically impossible to exert sufficient pressure on the connecting bolts to properly assemble the parts against the resistance to compression of the packing material, and in practice many cylinder walls have been actually burst by efforts to force the parts home under such conditions.

It is an object of this invention to provide a stuffing box wherein the sealing of the joint is effected by deformation of the packing material, and wherein the packing material is not so confined as to render bodily compression of the same necessary in order to properly assemble the elements of the joint, and yet wherein the parts are so related that a fluid-tight joint is retained under the various conditions of radial and axial expansion and contraction of the cylinder walls, the liner and the associated parts as a result of the different conditions of temperature existing in the engine, and wherein the sealing contact at the joint is effectively formed by a construction which is simple rugged and easy to assemble.

Another object of the invention is to provide a stuffing box which is so constructed that if excessive pressure is exerted on the packing material the stuffing box ring, and not the cylinder wall, will burst under the excessive pressure.

Other objects of the invention will appear as the description of the invention proceeds.

Stated generally the invention includes a stuffing box for a joint between the liner and the cylinder wall of an internal combustion engine which includes a ring that is detachably mounted around said joint and which restrains the packing material, the elements of the joint having cooperating surfaces which, in cooperation with the ring, force the packing material, by defromation of the same, into sealing contact with the elements of said joint.

The invention is capable of receiving a variety of mechanical expressions, two of which are shown on the accompanying drawing for purposes of illustration, but it is to be expressly understood that the drawing is for purposes of illustration only and is not to be construed as a definition of the limits of the invention, reference being had to the appended claims for that purpose.

In said drawing, wherein the same reference characters are employed to designate corresponding parts in the several figures:

Fig. 1 is an axial section of an internal combustion engine cylinder provided with a stuffing box embodying the present invention;

Fig. 2 is an axial section on the line 2—2 of Fig. 1;

Fig. 3 is a fragmentary axial section on an enlarged scale to illustrate the relation of the parts of the stuffing box;

Fig. 4 is a fragmentary section on an enlarged scale on the line 4—4 of Fig. 2;

Fig. 5 is a section corresponding to Fig. 3 and on a similar scale illustrating another construction which embodies the broader features of the present invention.

In the embodiments illustrated on the drawing 10 is a wall of the cylinder of an internal combustion engine of any suitable construction, said cylinder wall being shown as provided with a surrounding wall 11 which cooperates with the wall 10 to form the cooling water spaces 12 of the water jacket. Within the cylinder wall 10 is a liner 13 of any suitable construction, said liner, with the walls 10 and 11 and the cylinder head 14, completing the water jacket spaces as illustrated. Within the liner 13, which extends within the cylinder wall 10 for the major portion of its length and also projects exteriorly thereof for a considerable distance, is shown a piston 15 of any suitable construction. As the details of construction of the elements of the engine proper constitute no part of the present invention, further description thereof is unnecessary.

In conformity with the present invention, a stuffing box is provided for sealing the joint between the end 16 of the cylinder wall 10 and the contiguous portion 17 of the liner 13. In the form shown, said stuffing box comprises a ring 18 which surrounds the joint and the internal diameter of which is greater than the external diameter of the liner. Said ring 18 is preferably so constructed that in the event that excessive pressure is exerted on the packing material to be described, the ring will burst before the cylinder wall will burst. This may be accomplished by making the ring in one piece and of such a cross section that it will give way before the cylinder wall gives way, but for convenience of mounting or assembling the ring in operative position, the ring is preferably made in sections, being shown as composed of two halves each of which, as shown in Fig. 4, is provided at each end with one member of a lap joint 19. The ring sections may be held in assembled relation in any suitable way, the members of the lap joint 19 being shown as provided with apertures 20 to receive bolts 21 and nuts 22 to secure the ring sections fixedly in assembled relation.

Said bolts are preferably selected of such diameter that they will shear in the event of excessive pressure being exerted on the packing material, such shearing occurring before the ring or cylinder wall is burst by such pressure.

The cylinder wall 10 is preferably machined adjacent its end as shown at 23 and the ring 18 is similarly machined to provide a shoulder 24 which fits over the shoulder 23 as illustrated in Fig. 3. Means are preferably provided for detachably mounting the ring 18 on the end of the cylinder wall in this position, and to this end the ring is shown as provided with a pair of diametrically opposed apertures which receive cap screws 25 which may be threaded into tapped holes in the cylinder wall or the webs 27 which connect the cylinder wall with the exterior jacket wall 11. These cap screws perform the function of merely mounting the stuffing box ring in position on the end of the cylinder wall during the assembly of the liner and cylinder wall in a manner to be described.

The elements 16 and 17 of the joint and the ring 18 are so constructed as to cooperate in pressing the packing material 28 into sealing contact with the joint elements while deforming the packing material between the same. In the form shown in Figs. 1 to 4, the interior surface of the ring 18 is provided with an annular surface 29 which is inclined to the axis of the ring, said inclined surface 29 having a short axially extending surface 30 at one end which is of greater diameter than the diameter of the contiguous portion of the liner, and at its opposite end an axially extending surface 31 which is of greater diameter than the exterior surface of an annular projection 32 formed on the liner 13 and providing an annular shoulder 33 which is preferably at substantially right angles to the axis of the liner. These surfaces on the ring 18 cooperate with said shoulder 33 and the contiguous surfaces of the liner and cylinder end to deform the packing material 28 into sealing contact with the elements of the joint without bodily confinement of the packing material as shown in Fig. 3.

In assembling the parts the ring 18 is mounted on the end 16 of the cylinder wall by means of the cap screws 25. The packing material 28, which may be of any suitable character, is placed on the liner 17 against the shoulder 33. The liner 13 is then introduced into the cylinder wall 16, and may be forced home by the usual bolts 14′, the packing material 28 being pressed and deformed between the shoulder 33, the adjacent surface of the liner, the end wall of the cylinder and the surfaces at the interior of the ring 18 into substantially the form shown in Fig. 3. The radial surface or shoulder 33 insures that the packing material is forced axially against the end of the cylinder 16 so as to form a fluid-tight joint therewith, while the inclined surface 29 on the ring insures that the packing material is held against the periphery of the liner 13 to form a fluid-tight joint therewith. Hence little bursting pressure is exerted by said packing material on the coacting parts, but in the event that an excessive pressure is exerted on the packing material, it acts radially on the separate ring 18, tending to burst the latter rather than destroy the cylinder wall or its liner, and where the ring 18 is constructed in the manner heretofore described, this radial pressure on said ring, if excessive, will shear the bolts 21 without injuring the sections of the ring.

When it is desired to employ a ring which may slide over the liner into position, the inner surface of the ring may be made cylindrical, as shown in Fig. 5. The ring 18$^a$ of this embodiment may be made in one-piece or in sections as heretofore described, and may or may not be mounted detachably on the cylinder end as heretofore described, but as in the embodiment previously described, it cooperates with the packing material 28 to hold it against the periphery of the liner while permitting deformation of the packing material to effect a tight and permanent seal of the joint between the end of the cylinder wall and the contiguous surfaces on the liner.

It will, therefore, be perceived that a simple, rugged, readily assembled and relatively inexpensive but effective stuffing box construction has been provided which eliminates the wastage heretofore attendant on the bursting of the cylinder walls by reason of the imposition of excessive pressure thereon, and which assures that the parts may be forced home to their proper relationship without the necessity of exerting an excessive force thereon. The parts of the stuffing box are so constructed as to retain the sealed joint under the different conditions of expansion and contraction of the elements, and at the same time the parts are easy to manufacture and assemble and require but a minimum of labor in producing an effectively sealed joint.

While the embodiments of the invention illustrated on the drawing have been described in considerable detail, it is to be expressly understood that said embodiments have been selected for purposes of illustration only, as various other embodiments will now suggest themselves to those skilled in the art, while certain features may be used without other features, and changes may be made in details of construction, proportion and arrangement of parts without departing from the present invention. Reference is therefore to be had to the appended claims for a definition of said invention.

What I claim is:

1. In an internal combustion engine, in combination with the engine cylinder and its liner projecting therefrom, a stuffing box for the joint between said liner and cylinder including a detachable ring surrounding said joint, and packing material confined by said ring in sealing contact with said joint, said ring being so constructed that it will burst before the cylinder wall under excessive sealing pressure on said packing material.

2. In an internal combustion engine, in combination with the engine cylinder and its liner projecting therefrom, a stuffing box for the joint between said liner and cylinder including a detachable ring surrounding said joint, and packing material confined by said ring in sealing contact with said joint, said ring being formed in sections jointed by bolts that will shear under excessive pressure on said packing material.

3. In an internal combustion engine, in combination with the engine cylinder and its liner projecting therefrom, a stuffing box for the joint between said liner and cylinder including a detachable ring surrounding said joint, said ring being formed in sections, means for connecting said sections, and packing material confined by said ring in sealing contact with said joint.

4. In an internal combustion engine, the combination of the engine cylinder and its liner, an external annular shoulder on said liner opposite the end of the cylinder wall, a ring surrounding said elements and of greater internal diameter than said shoulder, and packing material between said shoulder, cylinder end and ring and reacting against and compressed by said elements.

5. In an internal combustion engine, the combination of the engine cylinder, a liner in said cylinder having an external annular shoulder of greater diameter than the internal diameter of said cylinder, a ring mounted on the end of the cylinder wall and having a greater internal diameter than said shoulder, and packing material within said ring between the end of the cylinder wall and said shoulder.

6. In an internal combustion engine, the combination of the engine cylinder and its liner having oppositely disposed spaced shoulders, a packing material between said shoulders, and a ring surrounding said elements and leaving an opening between said liner and the internal face of said ring.

7. In an internal combustion engine, the combination of the engine cylinder, a liner having an external annular shoulder, a ring mounted on the end of the cylinder wall and out of contact with said liner, and packing material within said ring compressed between said shoulder and the end of the cylinder wall.

8. An organization comprising in combination, a tubular jacket having two longitudinally spaced annular seating faces, a tubular member telescopically mounted within said jacket and provided with peripheral longitudinally spaced annular seating faces for respectively cooperating with said first-named seating faces, a ring surrounding one pair of said cooperating seating faces and out of contact with said telescoping tubular member, packing material between said faces within the ring, and means forcing said two pairs of seating faces towards each other.

In testimony whereof I have signed this specification.

CHARLES H. SHEASLEY.